US007119963B1

(12) United States Patent
Cassara

(10) Patent No.: US 7,119,963 B1
(45) Date of Patent: Oct. 10, 2006

(54) LENTICULAR SCREEN WITH REMOVABLE ALIGNMENT TAB

(76) Inventor: Leonard Jay Cassara, P.O. Box 1366, Boulder, CO (US) 80306

( * ) Notice: Subject to any disclaimer, the term of this patent is extended or adjusted under 35 U.S.C. 154(b) by 66 days.

(21) Appl. No.: 11/016,257

(22) Filed: Dec. 16, 2004

Related U.S. Application Data

(60) Provisional application No. 60/531,069, filed on Dec. 19, 2003.

(51) Int. Cl.
*G02B 27/10* (2006.01)
*H01L 23/544* (2006.01)

(52) U.S. Cl. ..................... 359/619; 257/797
(58) Field of Classification Search ........ 359/619–621, 359/626; 257/432, 797; 700/124–125
See application file for complete search history.

(56) References Cited

U.S. PATENT DOCUMENTS 6,795,159 B1    9/2004  Cassara
6,836,003 B1 *  12/2004 Corisis et al. ............. 257/797
2003/0117713 A1 *  6/2003 Border et al. ............. 359/619

\* cited by examiner

*Primary Examiner*—Georgia Epps
*Assistant Examiner*—Alicia M Harrington
(74) *Attorney, Agent, or Firm*—Faegre & Benson LLP

(57) ABSTRACT

According to various embodiments of the present invention, an apparatus for aligning lenticular screen with substrate image, comprising a lenticular screen with plurality of lenticules, alignment tab, and optical alignment device formed on alignment tab. In some instances, alignment tab has magnifying lens with focal point at a registration groove; in other instances, alignment tab has distorting channel for alignment with a registration line. According to other embodiments, methods comprising providing a lenticular screen attached to first alignment tab, the lenticular screen having a plurality of lenticules, the alignment tab having an optical alignment device, providing a substrate image removably attached to a second alignment tab having a registration line parallel to a printed row of substrate image, aligning first alignment tab with registration line using optical alignment device, affixing first alignment tab to second alignment tab, affixing lenticular screen to substrate image, and removing first and second alignment tabs.

30 Claims, 6 Drawing Sheets

LENTICULAR SCREEN WITH REMOVABLE ALIGNMENT TAB

CROSS-REFERENCE TO RELATED APPLICATIONS

This application claims the benefit under 35 U.S.C. § 119(e) of U.S. Provisional Patent Application No. 60/531,069, filed on Dec. 19, 2003, the contents of which are herein incorporated by reference in their entirety for all purposes.

BACKGROUND OF THE INVENTION

1. Field of the Invention

The present invention relates generally to creating an autostereoscopic image or animation flip with a lenticular screen, and more particularly to an improved lenticular screen and/or printed substrate image having removable alignment tabs to permit easier alignment of the lenticular screen and the printed substrate prior to their attachment.

2. Description of Related Art

An autostereoscopic image, or an animation flip, typically consists of a lenticular screen and a printed substrate image. The lenticular screen comprises rows of lenticules, which are lenses that permit different portions of the printed substrate image to be visible from different viewing angles through the lenticular screen. For example, rows of two or more images may be interlaced and printed to form the printed substrate image, such that when the printed substrate image is viewed through the lenticular screen, different images may be seen from different viewing angles, creating an "animation flip." Various other effects can be achieved based on the geometry of the lenticules and/or lenticular screen, as well as on the configuration and/or layout of the printed substrate image. For example, in addition to creating an "animation flip" effect, different lenticular screens and printed substrate images may be employed to create three-dimensional and/or "fly's eye" effects.

Once a lenticular screen has been selected and a printed substrate image obtained, they must be attached to one another to create the autostereoscopic image. At this stage, proper alignment of the lenticular screen with the printed substrate image is important. For instance, with respect to three-dimensional or "flip animation" images, the rows of lenticules on the lenticular screen must be lined up parallel with the printed image rows on the printed image substrate. If the lenticular screen is slightly askew with respect to the printed substrate image, a phenomenon known as "banding" will be present, in which a band of misaligned rows appears across the face of the autostereoscopic image. The larger the angle of skew between the lenticular screen and the printed substrate image, the more banding will be noticeable. In addition, a smaller lenticule size, a greater lenticule frequency, or a greater number of interlaced images on the printed substrate image increases the difficulty of aligning the lenticular screen, particularly with the naked eye.

Current methods for aligning the lenticular screen include sliding the lenticular screen over the printed substrate image prior to attachment, until the naked eye perceives an alignment between the two and the image appears correctly through the lenticular screen. In such cases, the lenticular screen is held in place by hand until it can be affixed to the printed substrate image. The lenticular screen is typically affixed to the printed substrate image with an optical cement. However, this process often leads to slippage or tilting of the lenticular screen as the optical cement is applied and/or the lenticular screen is secured to the printed substrate image. Holding the lenticular screen in place by hand while optical cement is applied may also increase the occurrence of air bubbles between the lenticular screen and the printed substrate image, as both hands are not always available to control the placement of the lenticular screen and/or the smoothing out of bubbles. In addition, care must be taken to not overly bend the lenticular screen, so as to damage it.

Various other methods exist for aligning the lenticular screen with a printed substrate image. For example, the lenticular screen and the printed substrate image may be cut precisely along a straight line such that they may be properly aligned by lining up the straight edges of the lenticular screen and the printed substrate image. However, this method may require special tools, and although effective for large-scale production of autostereoscopic images, is not as accessible to a home user or creator of a single autostereoscopic image. In other embodiments, an image may be printed, in reverse, directly onto the flat surface of a lenticular screen. However, this method may require a special printer; further, this method requires increased precision in the printing process that leads to a higher risk of "banding."

Thus, for these and other reasons, there exists a need in the art for methods and a relatively self-contained apparatus for more easily aligning and affixing a lenticular screen to a printed substrate image, so as to facilitate the alignment and to set and preserve the alignment prior to attachment of the lenticular screen to the printed substrate image.

BRIEF SUMMARY OF THE INVENTION

Embodiments of the present invention are related to creating an autostereoscopic image or animation flip with a lenticular screen, and more particularly to an improved lenticular screen and/or printed substrate image having removable alignment tabs to permit easier alignment of the lenticular screen and the printed substrate prior to their attachment.

Some embodiments of the present invention provide an apparatus for aligning a lenticular screen with a substrate image. Such apparatus includes a lenticular screen with a plurality of lenticules, an alignment tab removably attached to the lenticular screen, and at least one optical alignment device formed on the alignment tab. Optical alignment devices include, but are not limited to, a distorting channel and a magnifying lens. In some embodiments with a magnifying lens, at least one registration groove is formed on the alignment tab parallel to at least one of the lenticules, and the magnifying lens has a focal point at the registration groove.

In some cases, the magnifying lens is a ridge substantially parallel to a registration groove. In other cases, the registration groove is formed on one side of the alignment tab, and the magnifying lens is formed on the other side of the alignment tab. In cases where there are two or more registration grooves, one registration groove may exist at an angle to the other; for example, two registration grooves may be perpendicular to each other.

According to certain embodiments of the present invention, a notch may be formed between the lenticular screen and the alignment tab. The notch is configured to permit the lenticular screen to pivot with respect to the alignment tab around the notch. The notch is also configured to permit the alignment tab to be removed from the lenticular screen. Additionally, the notch is configured to guide a cutting tool in separating the alignment tab from the lenticular screen. In some instances, the notch forms a perforation between the lenticular screen and the alignment tab.

According to various other embodiments, at least one hole may be formed through the alignment tab, such that the alignment tab may be aligned over a printed dot on a printed substrate. In some cases, the at least one hole is configured to receive alignment pins. In the place of the at least one hole, the alignment tab may include a magnifying lens having a focal point at a printed dot on a printed substrate.

Other embodiments of the present invention provide methods for aligning a lenticular screen with a substrate image, including providing a lenticular screen that is removably attached to a first alignment tab, the lenticular screen having a plurality of lenticules, the alignment tab having formed thereon at least one optical alignment device. The methods further include providing a substrate image removably attached to a second alignment tab, the second alignment tab having at least one registration line parallel to at least one printed row of the substrate image, aligning the first alignment tab with the at least one registration line using the at least one optical alignment device, affixing the first alignment tab to the second alignment tab, affixing the lenticular screen to the substrate image, and removing the first alignment tab from the lenticular screen and the second alignment tab from the substrate image. An optical alignment device includes, but is not limited to, a magnifying lens, a distorting channel, a plano-concave lens, and/or a plano-convex lens.

In some cases, the alignment tab has formed thereon at least one registration groove parallel to at least one of the lenticules. In such cases, aligning the alignment tab with the registration line involves aligning the registration groove with the registration line. In other instances, aligning the registration groove with the registration line includes aligning the registration groove to be parallel to the registration line. In yet other instances, aligning the registration groove to be parallel to the registration line includes aligning the registration groove to overlay the registration line.

According to some embodiments, the lenticular screen is removably attached to the first alignment tab at a break-off notch, and the substrate image is removably attached to the second alignment tab at a perforation line. In such instances, affixing the first alignment tab to the second alignment tab includes aligning the break-off notch with the perforation line, and removing the first alignment tab from the lenticular screen and the second alignment tab from the substrate image includes removing the first alignment tab and the second alignment tab simultaneously along the perforation line. According to other embodiments, affixing the first alignment tab to the second alignment tab includes applying therebetween an attachment compound such as an adhesive film or an optical cement. According to yet other embodiments, affixing the lenticular screen to the substrate image includes applying therebetween an attachment compound such as an adhesive film or an optical cement.

According to some embodiments, the lenticular screen has a first edge in proximity with the first alignment tab, and a second edge opposite the first edge; in those cases, affixing the lenticular screen to the substrate image includes gradually pushing the lenticular screen onto the substrate image from the first edge toward the second edge to avoid air bubble formation. In some cases, the optical alignment device is a magnifying lens with a focal point at the registration groove, and aligning the registration groove with the registration line includes viewing the registration groove through the magnifying lens.

Various other embodiments of the present invention provide methods for aligning a lenticular screen with a substrate image, including: providing a lenticular screen flexibly attached to a first alignment tab, the lenticular screen having a plurality of lenticules, the alignment tab having formed thereon at least one registration groove parallel to at least one of the plurality of lenticules, providing a substrate image flexibly attached to a second alignment tab, the second alignment tab having at least one registration line parallel to at least one printed row of the substrate image, and aligning the registration groove with the registration line. Such embodiments of methods further include affixing the first alignment tab to the second alignment tab to create an alignment tab assembly, affixing the lenticular screen to the substrate image to create a lenticular image assembly, and folding the alignment tab assembly one hundred eighty degrees with respect to a viewing surface of the lenticular screen to reinforce an outer edge of the lenticular image assembly. In some embodiments, the methods further include exposing an adhesive film applied to a first underside of the second alignment tab of the alignment tab assembly and attaching the first underside to a second underside of the substrate image of the lenticular image assembly to reinforce the outer edge of the lenticular image assembly. In other embodiments, the methods further include exposing an adhesive film applied to a first top side of the first alignment tab of the alignment tab assembly, and attaching the first top side to a second top side of the lenticular screen of the lenticular image assembly to frame at least one outer edge of the viewing surface.

Yet other embodiments of the present invention provide methods for aligning a lenticular screen with a substrate image, including: providing a lenticular screen attached to a first transparent alignment tab, the lenticular screen having a plurality of lenticules, the alignment tab having formed thereon at least one registration groove parallel to at least one of the plurality of lenticules, and providing a substrate image attached to a second alignment tab, the second alignment tab having at least one registration line parallel to at least one printed row of the substrate image, the at least one registration line forming at least part of a decorative frame drawing. The methods further include aligning the registration groove with the registration line, affixing the first transparent alignment tab to the second alignment tab, such that the decorative frame drawing may be seen through the first transparent alignment tab, and affixing the lenticular screen to the substrate image.

This summary provides only a general outline of some embodiments of the present invention. Many other objects, features, advantages and other embodiments of the present invention will become more fully apparent from the following detailed description, the appended claims, and the accompanying drawings.

BRIEF DESCRIPTION OF THE SEVERAL VIEWS OF THE DRAWING

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

One or more embodiments of the present invention are related to creating an autostereoscopic image or animation flip with a lenticular screen, and more particularly to an improved lenticular screen and/or printed substrate image having removable alignment tabs to permit easier alignment of the lenticular screen and the printed substrate prior to their attachment.

This description may refer to lenticular screen, lenticule, and/or screen. It should be understood that these words are intended to include any type of appropriate viewing material, including lenticular, barrier strip, fly's eye, etc., that can be utilized to obtain three-dimensional and/or animation effect.

Figure 1:
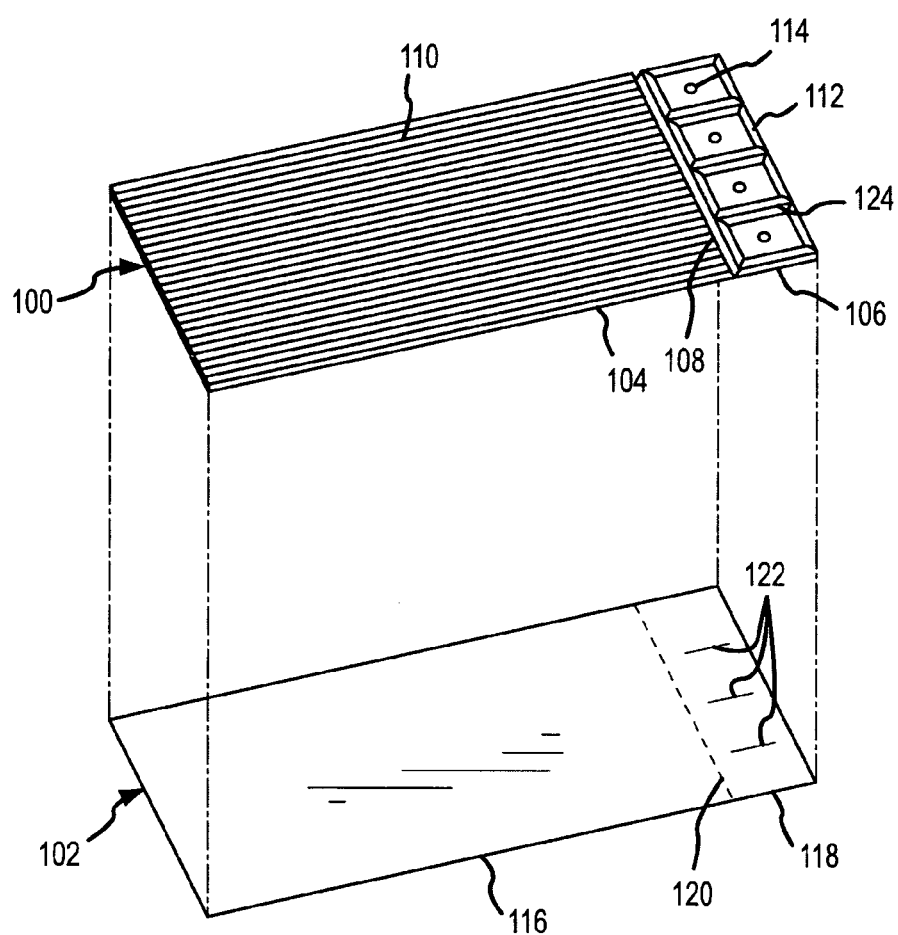
FIG. 1 is an exploded view of a lenticular screen layer and substrate layer according to various embodiments of the present invention.

FIG. 1 depicts an exploded view of a lenticular screen layer 100 and a substrate layer 102 according to various embodiments of the present invention. Lenticular screen layer 100 includes a lenticular screen 104 and an alignment tab 106. Lenticular screen 104 comprises a plurality of lenticules 110. A break-off notch 108 is provided between alignment tab 106 and lenticular screen 104. Alignment tab 106 includes registration grooves 124 and/or magnifying ridges 112. According to some embodiments, magnifying ridges 112 form a repeating square pattern along alignment tab 106. According to other embodiments, each square of the repeating square pattern may include a hole 114. According to yet other embodiments of the present invention, alignment tab 106 includes round magnifying lenses in the place of holes 114.

As shown by the exploded view of FIG. 1, lenticular screen layer 100 is configured to overlay substrate layer 102. Substrate layer 102 includes a substrate image 116 and an alignment tab 118. A perforation line 120 exists between substrate image 116 and alignment tab 118. Alignment tab 118 includes registration lines 122 parallel to interlaced printed rows of substrate image 116.

In a typical scenario, images are selected and interwoven to become part of substrate image 116. For instance, a computer program is used to mesh and/or interweave digital images to create an animation flip. The interwoven images are printed on a substrate material, such as a paper specially coated to accept printing ink for high-resolution image printing. For example, the substrate material is an ink-jet printable medium, such as a glossy photo premium inkjet paper. The configuration of the interweaving of substrate image 116 depends on the density of lenticules 110 on lenticular screen 104. For example, if lenticular screen 104 has seventy-two lenticules 110 per inch, then the substrate image 116 is printed interlacing at least one row from each digital image every $1/72$ inch. For a substrate image 116 created by interweaving three digital images, three rows (one row from each image) would be printed for each $1/72$ inch. In this example, a single row of each of three digital images would be $1/216$ inches wide, corresponding to one-third of $1/72$ inches.

When substrate image 116 is printed, registration lines 122 are also printed on the other side of perforation 120. Registration lines 122 are printed parallel to the interwoven rows of substrate image 116. As one possible example, for use with lenticular screen 104 of seventy-two lenticules 110 per inch, registration lines 122 may be printed every $1/2$ inches to correspond with the top centerline of every thirty-sixth lenticule. For a substrate image 116 of three interwoven images, the registration line 122 may be printed parallel to every thirty-sixth set of three rows, and located exactly the same distance from the top of the first interlaced image row as from the bottom of the third interlaced image row, corresponding to the top centerline of every thirty-sixth lenticule. Although this alignment will provide the optimal effect, registration lines 122 may alternatively be printed without regard to the top centerline of every thirty-sixth lenticule (or the centerline of each set of interlaced rows), as long as they are printed parallel to the interlaced image rows.

And although FIG. 1 depicts more than one registration line 122, alignment may be achieved with as few as one registration line 122. However, multiple registration lines 122 may increase the ease of alignment by providing multiple points of reference. And although FIG. 1 depicts registration lines 122 parallel to interlaced image rows of substrate image 116 and/or lenticules 110, alignment tab 118 may additionally include one or more registration lines 122 perpendicular to interlaced image rows of substrate image 116 and/or lenticules 110. Based on the disclosure provided herein, one of ordinary skill in the art will appreciate the various ways in which images may be interlaced and printed as substrate image 116, and in which registration lines may be printed, to correspond to various lenticular screens 104 with varying lenticule 110 density, geometry, and composition. Based on the disclosure herein, one of ordinary skill in the art will also appreciate that the number of images to be interwoven as substrate image 116, as well as the geometry and/or lenticule 110 density of lenticular screen 104, may be limited by the smallest width or pixel size able to be correctly printed.

Once substrate image 116 and registration lines 122 have been created on substrate layer 102, screen layer 100 is then aligned and attached to substrate layer 102. Registration grooves 124 correspond to lenticules 110 in much the same way that registration lines 122 correspond to interlaced rows of substrate image 116. For instance, using the aforementioned example of the lenticular screen 104 having seventy-two lenticules 110 per inch, registration grooves 124 could line up with the top centerline of every thirty-sixth lenticule 110. According to some embodiments of the present invention, lenticules 110 are etched into the top of lenticular screen 104, and registration grooves 124 are etched into the bottom of alignment tab 106. According to yet other embodiments of the present invention, registration grooves 124 are arranged in a repeating square pattern along the length of alignment tab 106.

Lenticular screen 104 may be constructed of clear optical plastic of a semi-flexible character. Alignment tab 106 may also be constructed of clear optical plastic, is more rigid than lenticular screen 104, and is predominately thin and flat. Alignment tabs 106 and/or 118, though shown bordering only one edge of lenticular screen 104 and/or substrate image 116, may border any or all edges of lenticular screen 104 and/or substrate image 116. Registration grooves 124 and registration lines 122 may be seen through alignment tab 106. In some instances, registration lines 122 and/or registration grooves 124 are essentially the thickness of one pixel of an ink jet printer or other suitable printer device used to make registration lines 122.

In a typical alignment process, substrate layer 102 is placed onto a flat surface, such as a table. Screen layer 100 is placed on top of substrate layer 102, and screen layer 100 is positioned such that registration grooves 124 overlap registration lines 122. Due to configuration and/or placement of registration lines 122 and/or registration grooves 124, lenticular screen 104 will be correctly aligned with substrate image 116 when at least one registration groove 124 overlays at least one registration line 122. In yet other instances, different colors may be printed on each side of registration line 122; for example, red may be placed just above and green just below registration line 122. In such instances, a misalignment between registration groove 124 and registration line 122 may become more easily apparent if, for example, the color red may be seen to surround both sides of registration groove 124. According to various other embodiments of the present invention, in addition to aligning registration grooves 124 with registration lines 122, break-off notch 108 may also be aligned with perforation line 120. According to yet other embodiments of the present invention, holes 114 with a known placement may also be aligned over dots printed onto alignment tab 118 to correspond with the known placement.

In addition to manual alignment, various other alignment processes and/or devices may be used compatibly with some embodiments of the present invention. For instance, screen layer 100 may be aligned with substrate layer 102 employing embodiments of alignment devices set forth in U.S. Pat. No. 6,795,159, filed May 21, 2002, entitled "Mechanism for Aligning Lenticular Material and Image," the contents of which are herein incorporated by reference in their entirety. For example, holes 114 may be configured to receive pins from such embodiments of alignment devices, and substrate layer 102 may be held in a fixed position by a clip of such embodiments of alignment devices as screen layer 100 is moved incrementally over substrate layer 102 until registration grooves 124 align with registration lines 122.

According to other embodiments of the present invention, alignment tab 118 also has holes centered to correspond to the same location as holes 114 in alignment tab 106. The holes in alignment tab 118 would be slightly larger than holes 114. Substrate layer 102 is placed onto a flat surface of embodiments of alignment devices, and protruding pins extending from the embodiments of alignment devices extend through the holes in alignment tab 118. The holes in alignment tab 118 are oversized so that substrate layer 102 can move slightly in relation to the protruding pins. Next, screen layer 100 is placed over substrate layer 102, and holes 114 in alignment tab 106 fit snugly over the protruding pins. This allows the placement of substrate layer 102 to be adjusted slightly in the horizontal and vertical (x and y) directions while alignment tab 106, and thus lenticular screen 104, remain in a fixed position. Substrate layer 106 is adjusted in the x and y directions until registration lines 122 overlay registration grooves 124, as seen more clearly through magnifying ridges 112.

Once alignment has been achieved, one process for securing lenticular screen 104 to substrate image 116 employing embodiments of alignment devices is as follows: lenticular screen 104 is flipped away from substrate image 116 while the alignment tab 106 remains in place. The release liner on the adhesive on the back of lenticular screen 104 is peeled away (or optical cement is applied to substrate image 116) and lenticular screen 104 is returned to substrate image 116 in precise alignment. The resulting screen layer 100 and substrate layer 102 assembly is lifted from the protruding pins and alignment tab 106 is torn off lenticular screen 104, leaving an aligned autostereoscopic image with a clean edge.

Another process for securing lenticular screen 104 to substrate image 116, according to various embodiments of the present invention, is as follows: screen layer 100 is held onto substrate layer 102 in preparation for affixing screen layer 100 to substrate layer 102. In some cases, an optical cement is applied between screen layer 100 and substrate layer 102 to affix screen layer 100 to substrate layer 102. In other cases, screen layer 100 has a clear optical adhesive affixed to a bottom surface, and the clear optical adhesive is protected until use by a non-stick clear release liner. The clear optical adhesive may alternatively be protected until required use by two or more non-stick clear release liners, such as one covering the bottom surface of alignment tab 106 and another covering the bottom surface of lenticular screen 104.

Figure 3:
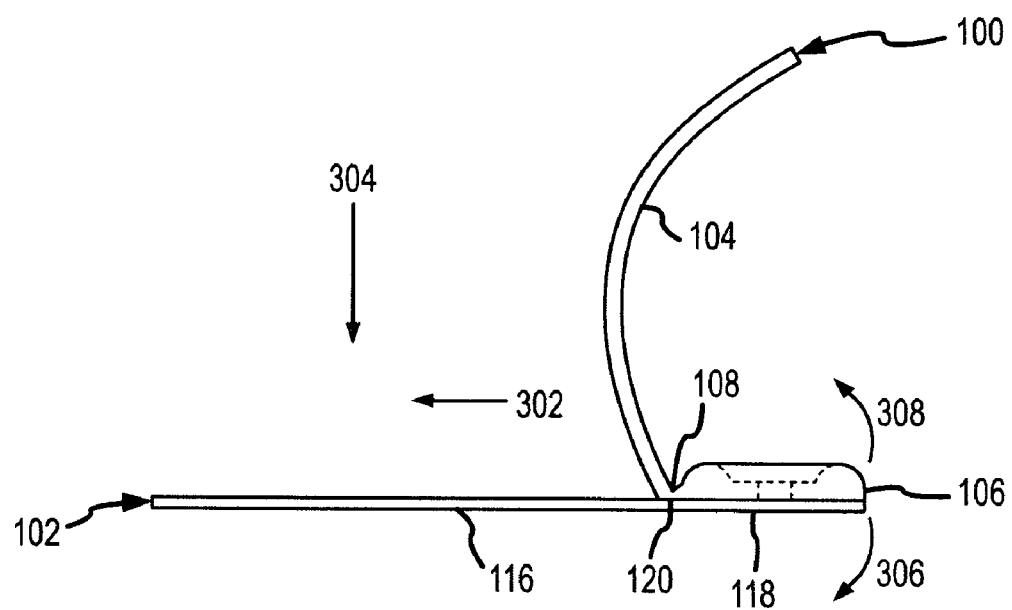
FIG. 3 depicts a front view of the lenticular screen layer and substrate layer, showing a first alignment tab of the lenticular screen layer attached to a second alignment tab of the substrate layer, according to various embodiments of the present invention.

Break-off notch 108 allows lenticular screen 104 to bend with respect to alignment tab 106, as illustrated by FIG. 3. Conversely, break-off notch 108 also allows alignment tab 106 to bend with respect to lenticular screen 104. As one example, break-off notch is formed by a V-shaped groove formed between lenticular screen 104 and alignment tab 106. Once alignment has been achieved, lenticular screen 104 is held onto substrate image 116, and alignment tab 106 is bent and/or folded upward at break-off notch 108. If optical cement is being used to attach the two layers, optical cement is then applied to the bottom surface of alignment tab 106. If, instead, clear optical adhesive is affixed to the bottom surface and protected until use by a non-stick clear release liner, then the non-stick clear release liner is removed from the bottom surface of alignment tab 106. Next, alignment tab 106 is folded back on top of alignment tab 118 and secured in place by the optical cement or adhesive.

Once alignment tab 106 has been attached to alignment tab 118, lenticular screen 104 need no longer be held in place. FIG. 3 depicts a front view of screen layer 100 and substrate layer 102, showing alignment tab 106 attached to alignment tab 118, according to various embodiments of the present invention. As depicted in FIG. 3, lenticular screen 104 is free to pivot about break-off notch 108. Break-off notch 108 may act as a hinge to permit lenticular screen 104 to pivot in an arc around the edge of alignment tab 106. Such a hinge allows lenticular screen 104 to be positioned over and in contact with substrate image 116, pivoted out of the way, and repositioned back into the same place as long as alignment tab 106 has not moved with respect to alignment tab 118.

Lenticular screen 104 is folded away from substrate image 116 as depicted in FIG. 3, and optical cement is applied to the bottom surface of lenticular screen 104.

Alternatively, clear optical adhesive is present on the bottom surface of lenticular screen 104 and protected until use by a non-stick clear release liner, in which case the non-stick clear release liner is removed from the bottom surface of lenticular screen 104. Lenticular screen 104 is then folded back down and attached to substrate image 116. According to some embodiments of the present invention, in attaching lenticular screen 104 to substrate image 116, a force is applied to top of lenticular screen 104 in the direction of arrow 304. This force may be applied starting near break-off notch 108 and proceeding in the direction indicated by arrow 302, so as to smooth out lenticular screen 104 from one edge to another. This motion for affixing lenticular screen 104 to substrate image 116 may help prevent the formation of air bubbles between lenticular screen 104 and substrate image 116.

According to various embodiments of the present invention, once lenticular screen 104 has been attached to substrate image 116, alignment tabs 106 and/or 118 may be removed. Break-off notch 108 may be constructed thin enough so as not only to serve as a hinge, but also, with little manual effort, to be torn so that alignment tab 106 can be cleanly removed from lenticular screen 104 leaving a smooth, finished edge on lenticular screen 104. Alignment tab 118 may be removed from substrate image 116 by tearing at perforation line 120. Alignment tab 106 may be removed from lenticular screen 104 by ripping or tearing along break-away notch 108. According to various embodiments illustrated in FIG. 3, break-off notch 108 has been aligned directly over perforation 120. In these cases, alignment tab 106 and alignment tab 118 may be removed simultaneously by tearing and/or pulling along break-off notch 108 and/or perforation 120, in a direction opposite to arrow 302. The size of substrate image 116 may be the same as the size as lenticular screen 104, so as to leave no overhanging edges of lenticular screen 104 and/or substrate image 116 when alignment tabs 106, 118 have been removed. In yet other embodiments of the present invention, a knife or other cutting instrument may be used to cut along break-off notch 108 and/or perforation 120 so as to remove alignment tabs 106, 118; in some cases, break-off notch 108 and/or perforation 120 may serve to guide the cutting instrument along a straight line.

According to various other embodiments of the present invention, alignment tab 118 surrounds one or more edges, or all edges, of substrate image 116. Registration lines 122 are incorporated into a decorative pattern, and alignment tab 106 surrounds one or more edges, or all edges, of lenticular screen 104. When lenticular screen 104 is attached to substrate image 116, alignment tabs 106, 118 are not removed but instead provide a decorative frame for the autostereoscopic image, of which the viewing area is defined by lenticular screen 104 through which substrate image 116 may be seen. Registration lines 122 that have been incorporated into a decorative pattern, as well as corresponding registration grooves 124, may be seen through transparent alignment tab 106. According to such embodiments, perforation line 120 may be eliminated, and break-off notch 108 may be alternatively configured to permit bending or pivoting, but not tearing or removal.

According to yet other alternative embodiments of the present invention, once lenticular screen 104 has been attached to substrate image 116, alignment tabs 106 and 118 may be folded at break-off notch 108 through one hundred eighty degrees in the direction of arrow 308, and the top of alignment tab 106 may be affixed to the top of lenticular screen 104. This serves to provide a frame for a viewing area of lenticular screen 104, and/or to reinforce the stiffness and/or sturdiness of an outer edge of the lenticular screen 104/substrate image 116 assembly. Alternatively, alignment tabs 106 and 118 may be folded at break-off notch 108 through one hundred eighty degrees in the opposite direction, the direction of arrow 306, and the bottom of alignment tab 118 may be affixed to the bottom of substrate image 116, to reinforce the stiffness and/or sturdiness of an outer edge of the lenticular screen 104/substrate image 116 assembly. According to such embodiments, perforation line 120 may be eliminated, and break-off notch 108 may be alternatively configured to permit folding, bending, or pivoting, but not tearing or removal.

Figure 2:
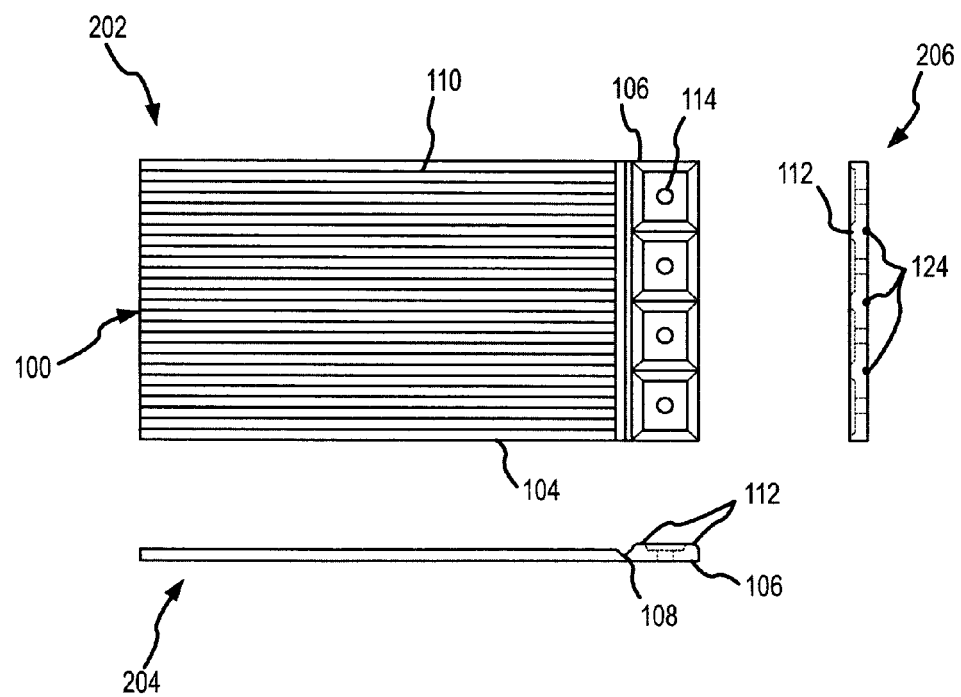
FIG. 2 illustrates top, front, and side views of a lenticular screen layer according to one or more embodiments of the present invention.

Turning now to FIG. 2, a top view 202, front view 204, and side view 206 of screen layer 100 are depicted. Front view 204 and side view 206 depict one possible geometry of magnifying ridges 112. According to some embodiments of the present invention, magnifying ridges 112 are semi-cylindrical, transparent magnification lenses having focal points at or near registration grooves 124. Magnifying ridges 112 may be constructed of the same material as screen layer 100. Magnifying ridges 112 aide in the alignment of registration grooves 124 with registration lines 122. For example, in some instances registration grooves 124 and/or registration lines 122 are extremely thin, such as $\frac{1}{720}$ inches, and it may be difficult to align them with the naked eye. Magnifying ridges 112 increase the apparent size of registration grooves 124 and/or registration lines 122, magnifying them for easier alignment.

According to some embodiments of the present invention, magnifying ridges 112 may be arranged in a repeating square pattern, as shown in FIG. 2. In some cases, alignment holes 114 are located in the middle of each of the squares of magnifying ridges 112. In various alternative embodiments according to the present invention, alignment tab 106 may have hemispherical magnifying lenses in the place of holes 114, with focal points at or near printed dots on alignment tab 118, for further precision in alignment. Based on the disclosure provided herein, one of ordinary skill in the art will appreciate that the specific geometry of magnifying ridges 112 (and also of lenticules 110) depends at least in part on the material properties of screen layer 100, such as thickness and/or refraction properties. Based on the disclosure provided herein, one of ordinary skill in the art will also appreciate the various other configurations of alignment tab 106 that serve to magnify at least one registration groove 124 and/or other mark placed on alignment tab 118.

Figure 4:
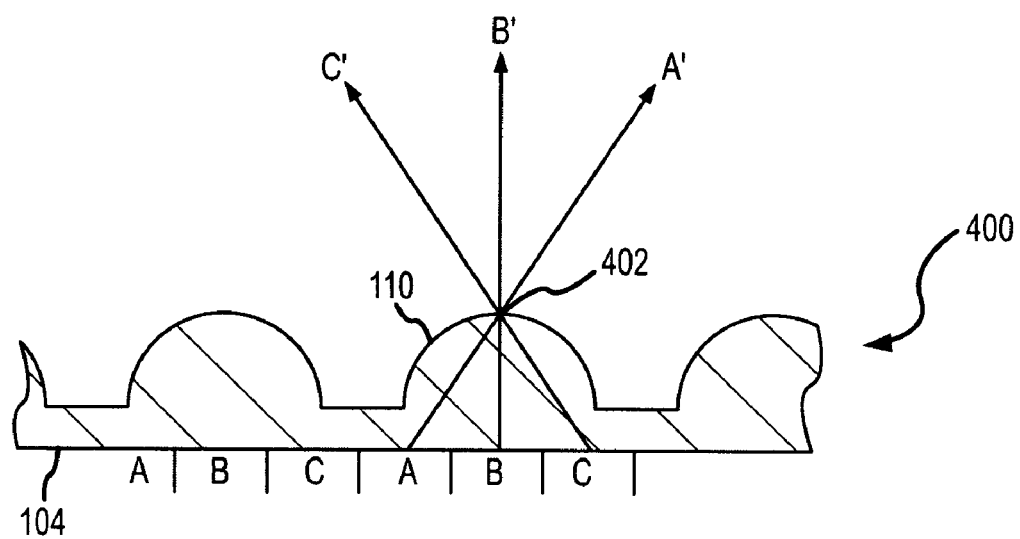
FIG. 4 illustrates a cross sectional view of at least a portion of a lenticular screen according to various embodiments of the present invention.
Figure 5:
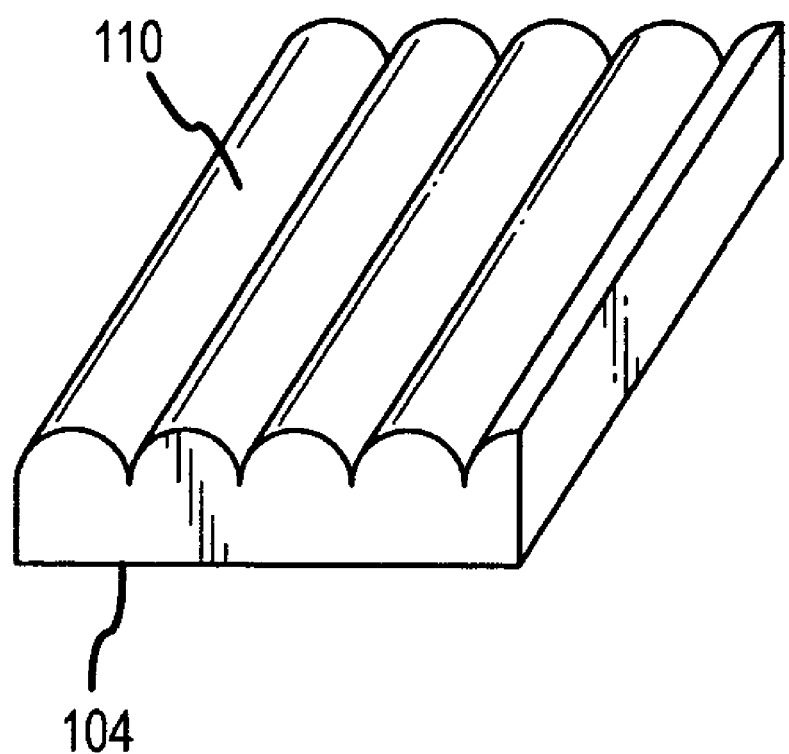
FIG. 5 is an isometric view of at least a portion of a lenticular screen according to various embodiments of the present invention.

Turning now to FIGS. 4 and 5, FIG. 5 illustrates an isometric view of at least a portion of a lenticular screen 104, showing one possible configuration of lenticules 110 according to various embodiments of the present invention. FIG. 4 illustrates a cross sectional view of an autostereoscopic image 400, showing at least a portion of a lenticular screen 104 and another possible configuration of lenticules 110 according to various embodiments of the present invention. Arrows representing viewing angles A', B', and C' pass through top centerline 402 of lenticule 110. Printed rows of three interlaced images, image A, image B, and image C, are shown. Each lenticule 110 covers one row of each interlaced image. When lenticular screen 104 is viewed from viewing angle A', the viewer sees rows of image A through each lenticule 110. When lenticular screen 104 is viewed from viewing angle B', the viewer sees rows of image B through each lenticule 110. When lenticular screen 104 is viewed from viewing angle C', the viewer sees rows of image C through each lenticule 110. This serves to create an animation flip effect as autostereoscopic image 400 is rotated through viewing angles A', B', and C'.

Figure 6A:
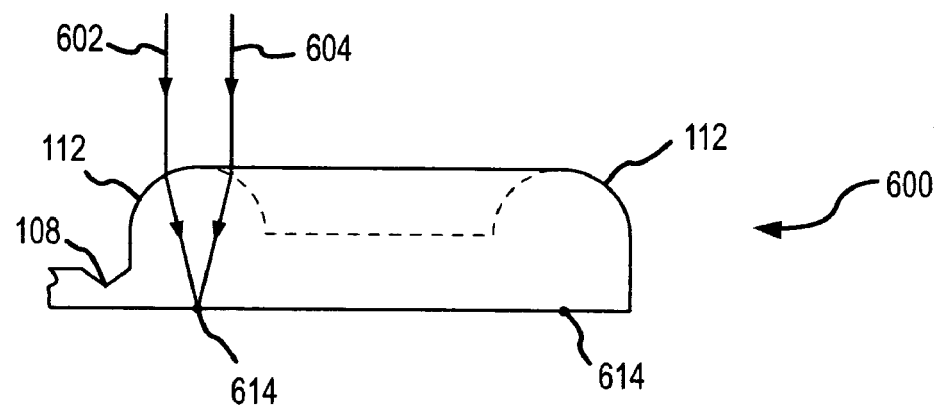
FIG. 6A illustrates a front view of an alignment tab of a lenticular screen layer according to various embodiments of the present invention.
Figure 6B:
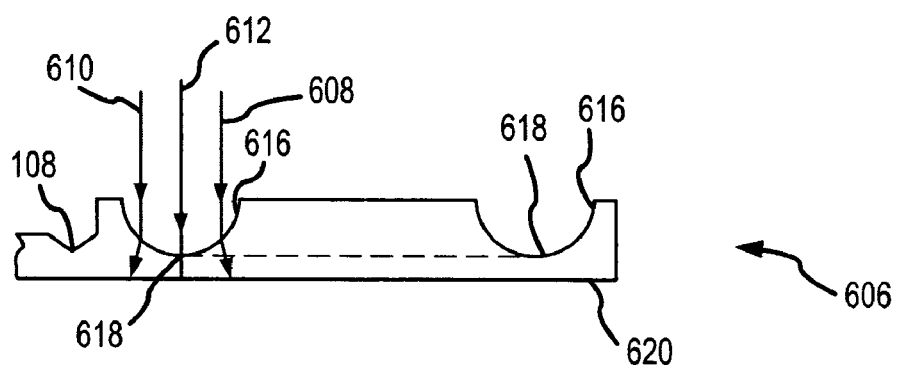
FIG. 6B illustrates a front view of another alignment tab of a lenticular screen layer according to various embodiments of the present invention.

Turning now to FIGS. 6A and 6B, FIG. 6A depicts a front view of an alignment tab 600 of a lenticular screen layer according to various embodiments of the present invention. Alignment tab 600 resembles alignment tab 106, except alignment tab 600 has registration grooves 614 that are orthogonal to the plane of the front view depicted in FIG. 6A. As described above, in some embodiments magnifying ridges 112 are semi-cylindrical, transparent magnification lenses having focal points at or near registration grooves 614. According to some embodiments, magnifying ridges 112 are plano-convex lenses. Arrows 602, 604 demonstrate how beams of light converge at the focal point (registration groove 614) after passing through magnifying ridge 112. Magnifying ridges 112 aide in the alignment of registration grooves 614 with registration lines. For example, in some instances registration grooves 614 and/or registration lines are extremely thin, such as 1/720 inches, and it may be difficult to align them with the naked eye. Magnifying ridges 112 increase the apparent size of registration grooves 614 and the surrounding area, magnifying them for easier alignment.

FIG. 6B depicts a front view of an alignment tab 606 of a lenticular screen layer according to various other embodiments of the present invention. Instead of magnifying ridges, alignment tab 606 has distorting channels 616. A pattern of distorting channels 616 on alignment tab 606 may correspond generally with the repeating square pattern of magnifying ridges 112 on alignment tab 106. According to some embodiments, distorting channels 616 are plano-concave lenses. At the lowest point of each distorting channel 616 is a nadir 618. Nadir 618 forms a line along the lowest point of each distorting channel 616, a line which runs orthogonally to the plane defined by the front view of FIG. 6B. In some embodiments, nadir 618 is relatively close to bottom 620 of alignment tab 606.

Due to the configuration of distorting channels 616, alignment tab 606 need not have corresponding registration grooves etched thereon. Alignment tab 606 is configured to permit alignment of nadir 618 with one or more registration lines. In other words, when an underlying registration line is aligned directly under nadir 618, or the line defined by nadir 618, the underlying registration line will not appear distorted. Arrows 608, 610 demonstrate how beams of light diverge or spread upon passing through distorting channel 616. However, arrow 612 demonstrates how a beam of light passing directly through nadir 618 is not distorted or diverged by distorting channel 616. Using these properties of distorting channels 616, alignment of distorting channels 616 with an underlying registration line may be achieved by changing the position of alignment tab 606 until no part of the underlying registration line appears distorted and/or divergent as viewed through distorting channels 616.

Embodiments of the invention have now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. An apparatus for aligning a lenticular screen with a substrate image, the apparatus comprising:
    a lenticular screen comprising a plurality of lenticules;
    an alignment tab removably attached to the lenticular screen; and
    at least one optical alignment device formed on the alignment tab.

2. The apparatus of claim 1, wherein the at least one optical alignment device is a distorting channel.

3. The apparatus of claim 1, wherein the at least one optical alignment device is a magnifying lens.

4. The apparatus of claim 3, further comprising:
    at least one registration groove formed on the alignment tab and parallel to at least one of the plurality of lenticules, wherein the magnifying lens has a focal point at the at least one registration groove.

5. The apparatus of claim 4, wherein the magnifying lens is a ridge substantially parallel to the at least one registration groove.

6. The apparatus of claim 4, wherein the at least one registration groove is formed on a first side of the alignment tab, and wherein the magnifying lens is formed on a second side of the alignment tab.

7. The apparatus of claim 4, wherein the at least one registration groove is a plurality of registration grooves, and wherein at least two of the plurality of registration grooves are not parallel to each other.

8. The apparatus of claim 7, wherein the at least two of the plurality of registration grooves are perpendicular to each other.

9. The apparatus of claim 1, further comprising:
    a notch formed between the lenticular screen and the alignment tab; wherein the notch is configured to permit the lenticular screen to pivot with respect to the alignment tab around the notch.

10. The apparatus of claim 9, wherein the notch is configured to permit the alignment tab to be torn from the lenticular screen.

11. The apparatus of claim 9, wherein the notch is configured to guide a cutting tool in separating the alignment tab from the lenticular screen.

12. The apparatus of claim 9, wherein the notch forms a perforation between the lenticular screen and the alignment tab.

13. The apparatus of claim 1, further comprising:
    at least one hole formed through the alignment tab, wherein the at least one hole is configured to be aligned over a printed dot on a printed substrate.

14. The apparatus of claim 1, further comprising:
    at least one hole formed through the alignment tab, wherein the at least one hole is configured to receive alignment pins.

15. The apparatus of claim 1, wherein the at least one optical alignment device is a magnifying lens, and wherein the magnifying lens has a focal point at a printed dot on a printed substrate.

16. A method for aligning a lenticular screen with a substrate image, the method comprising:
    providing a lenticular screen removably attached to a first alignment tab, the lenticular screen having a plurality of lenticules, the alignment tab having formed thereon at least one optical alignment device;
    providing a substrate image removably attached to a second alignment tab, the second alignment tab having at least one registration line parallel to at least one printed row of the substrate image;
    aligning the first alignment tab with the at least one registration line using the at least one optical alignment device;
    affixing the lenticular screen to the substrate image; and removing the first alignment tab from the lenticular screen and the second alignment tab from the substrate image.

17. The method of claim 16, the method further comprising:
affixing the first alignment tab to the second alignment tab.

18. The method of claim 17, wherein affixing the first alignment tab to the second alignment tab comprises applying therebetween an attachment compound selected from the group consisting of: an adhesive film and an optical cement.

19. The method of claim 16, wherein the optical alignment device is a device selected from the group consisting of: a magnifying lens, a distorting channel, a plano-concave lens, and a plano-convex lens.

20. The method of claim 16, wherein the alignment tab has formed thereon at least one registration groove parallel to at least one of the plurality of lenticules, and wherein aligning the alignment tab with the at least one registration line using the at least one optical alignment device comprises aligning the at least one registration groove with the at least one registration line.

21. The method of claim 20, wherein aligning the at least one registration groove with the at least one registration line comprises aligning the at least one registration groove to be parallel to the at least one registration line.

22. The method of claim 21, wherein aligning the at least one registration groove to be parallel to the at least one registration line comprises aligning the at least one registration groove to overlay the at least one registration line.

23. The method of claim 20, wherein the at least one optical alignment device is a magnifying lens with a focal point at the at least one registration groove, and wherein aligning the at least one registration groove with the at least one registration line comprises viewing the at least one registration groove through the at least one magnifying lens.

24. The method of claim 16, wherein the lenticular screen is removably attached to the first alignment tab at a break-off notch, wherein the substrate image is removably attached to the second alignment tab at a perforation line, wherein affixing the first alignment tab to the second alignment tab comprises aligning the break-off notch with the perforation line, and wherein removing the first alignment tab from the lenticular screen and the second alignment tab from the substrate image comprises removing the first alignment tab and the second alignment tab simultaneously along the perforation line.

25. The method of claim 16, wherein affixing the lenticular screen to the substrate image comprises applying therebetween an attachment compound selected from the group consisting of: an adhesive film and an optical cement.

26. The method of claim 25, wherein the lenticular screen has a first edge in proximity with the first alignment tab, and a second edge opposite the first edge, and wherein affixing the lenticular screen to the substrate image comprises gradually pushing the lenticular screen onto the substrate image from the first edge toward the second edge to avoid air bubble formation.

27. A method for aligning a lenticular screen with a substrate image, the method comprising:
providing a lenticular screen flexibly attached to a first alignment tab, the lenticular screen having a plurality of lenticules, the alignment tab having formed thereon at least one registration groove parallel to at least one of the plurality of lenticules;
providing a substrate image flexibly attached to a second alignment tab, the second alignment tab having at least one registration line parallel to at least one printed row of the substrate image;
aligning the at least one registration groove with the at least one registration line;
affixing the first alignment tab to the second alignment tab to create an alignment tab assembly;
affixing the lenticular screen to the substrate image to create a lenticular image assembly; and
folding the alignment tab assembly one hundred eighty degrees with respect to a viewing surface of the lenticular screen to reinforce an outer edge of the lenticular image assembly.

28. The method of claim 27, further comprising:
exposing an adhesive film applied to a first underside of the second alignment tab of the alignment tab assembly; and
attaching the first underside to a second underside of the substrate image of the lenticular image assembly to reinforce the outer edge of the lenticular image assembly.

29. The method of claim 27, further comprising:
exposing an adhesive film applied to a first top side of the first alignment tab of the alignment tab assembly;
attaching the first top side to a second top side of the lenticular screen of the lenticular image assembly to frame at least one outer edge of the viewing surface.

30. A method for aligning a lenticular screen with a substrate image, the method comprising:
providing a lenticular screen attached to a first transparent alignment tab, the lenticular screen having a plurality of lenticules, the alignment tab having formed thereon at least one registration groove parallel to at least one of the plurality of lenticules;
providing a substrate image attached to a second alignment tab, the second alignment tab having at least one registration line parallel to at least one printed row of the substrate image, the at least one registration line forming at least part of a decorative frame drawing;
aligning the at least one registration groove with the at least one registration line;
affixing the first transparent alignment tab to the second alignment tab, such that the decorative frame drawing may be seen through the first transparent alignment tab; and
affixing the lenticular screen to the substrate image.

* * * * *